United States Patent
Wakaizumi et al.

(10) Patent No.: US 6,324,444 B1
(45) Date of Patent: Nov. 27, 2001

(54) ROBOT WITH MULTI-JOINT ARMS MOVABLE IN HORIZONTAL PLANE

(75) Inventors: Kiyoshi Wakaizumi; Katsuaki Nozawa, both of Tokyo (JP)

(73) Assignee: Janome Sewing Machine Co., Ltd., Tokyo (JP)

( * ) Notice: Subject to any disclaimer, the term of this patent is extended or adjusted under 35 U.S.C. 154(b) by 0 days.

(21) Appl. No.: 09/353,732

(22) Filed: Jul. 14, 1999

(30) Foreign Application Priority Data

Jul. 29, 1998 (JP) .................................................. 10-213736

(51) Int. Cl.[7] .................................................... G06F 19/00
(52) U.S. Cl. .............................. 700/245; 700/48; 700/49; 700/51; 318/568.11; 701/23; 901/25; 901/26; 901/27; 901/28; 414/730
(58) Field of Search ..................................... 700/245, 248, 700/249, 251, 194, 262, 254, 247, 264, 258, 259; 483/1; 318/568.11, 568, 578, 574; 701/23; 74/490.02, 490.03; 901/23, 25, 28, 27, 48; 414/730; 378/193, 197

(56) References Cited

U.S. PATENT DOCUMENTS

| | | | |
|---|---|---|---|
| 3,890,552 | * 6/1975 | Devol et al. | 318/568.14 |
| 4,408,286 | * 10/1983 | Kikuchi et al. | 700/260 |
| 4,594,846 | * 6/1986 | Torii et al. | 59/5 |
| 4,705,447 | * 11/1987 | Smith | 414/590 |
| 4,744,719 | * 5/1988 | Asano et al. | 414/730 |
| 4,753,569 | * 6/1988 | Pryor | 700/250 |
| 4,827,791 | * 5/1989 | Richter | 74/469 |
| 4,831,547 | * 5/1989 | Ishiguro et al. | 700/247 |
| 4,883,249 | * 11/1989 | Garland | 248/566 |
| 4,891,765 | * 1/1990 | Hatori et al. | 700/262 |
| 4,894,788 | * 1/1990 | Stelzer | 700/249 |
| 5,055,755 | * 10/1991 | Ozawa et al. | 318/568.11 |
| 5,130,631 | * 7/1992 | Gordon et al. | 318/568.11 |
| 5,982,127 | * 11/1999 | Matsubara et al. | 318/568.11 |

* cited by examiner

Primary Examiner—William A. Cuchlinski, Jr.
Assistant Examiner—McDieunel Marc
(74) Attorney, Agent, or Firm—Nields & Lemack

(57) ABSTRACT

A robot with multi-joint arms, wherein articulated first and second arms 9, 10 are movable in a horizontal plane as well as in a vertical direction, the second arm having a free end to which a supplementary unit A is removably connected, the supplementary unit A including a joint member 17 adjustably connected to the free end of the second arm 10 and a working member 18 removable connected to the joint member 17. The working member 18 has a predetermined length $L_x$ which determines the effective length $L_2$ of the second arm 10, and wherein the data representing the effective length $L_2$ of the second arm is entered to renew the existing effective length of the second arm to produce new data representing the value of the newly entered effective length $L_2$ of the second arm 10, the new data being employed to calculate out the value to control the operations of the first and second arms 9, 10.

9 Claims, 7 Drawing Sheets

ROBOT WITH MULTI-JOINT ARMS MOVABLE IN HORIZONTAL PLANE

BACKGROUND OF THE INVENTION AND RELATED ART STATEMENT

1. Field of the Invention

The present invention relates to a robot with multi-joint arms and more particularly relates to a robot having articulated first and second arms having predetermined lengths respectively, the second arm having a free end to which a working member is removably connected, the working member having a predetermined length which determines the effective length of the second arm, the data representing the effective length of the second arm is entered to renew the existing effective length of the second arm, the renewed value of the effective length of the second arm being used to calculate out the data for controlling the operations of the first and second arms.

2. Prior Art

The robot with multi-joint arms movable in a horizontal plane as well as in vertical direction has been generally known. The conventional robot substantially comprises a first arm, a second arm articulated to one end of the first arm and a working member fixedly connected to the free end of the second arm. It has been a problem that the working member is fixedly connected to the second arm resulting in inability of optional adjustment in the effective length of the second arm with respect to a work to be processed. Therefore it has been required to change the second arm depending on a work to be processed.

Objects of the Invention

The invention has been provided to eliminate the defects and disadvantages of the prior art. It is therefore a principal object of the invention to provide a mechanically compact and dimensionally small seized robot.

It is another object of the invention to dispense with exchange of the second arm due to a work to be processed.

It is another object of the invention to provide a plurality of working members having predetermined lengths respectively, which may be selectively and removably connected to the second arm to determine the effective length of the second arm corresponding to any of the various works to be processed.

It is another object of the invention to provide a working member which may be easily connected and easily removed to and from the second arm.

It is still another object of the invention to provide a working member having a buffer against an impact which may be caused during operation of the robot.

SUMMARY OF THE INVENTION

In short, the invention substantially comprises a robot having articulated first and second arms mounted thereto such that the first and second arms may be turningly moved in a horizontal plane as well as in vertical direction by means of drive motors, the second arm having a free end to which a supplementary unit are adjustably connected, the supplementary unit including a joint member and a working member, the joint member being adjustably connected to the free end of the second arm, the working member being removably connected to the joint member, the working member having a predetermined length and being designed to provide an effective length of the second arm, the data representing the effective length of the second arm being entered to renew the existing effective length of the second arm, the data representing the renewed effective length of the second arm being used to calculate out a value for controlling the operations of the first and second arms.

DETAILED DESCRIPTION OF PREFERRED EMBODIMENT

Figure 1:
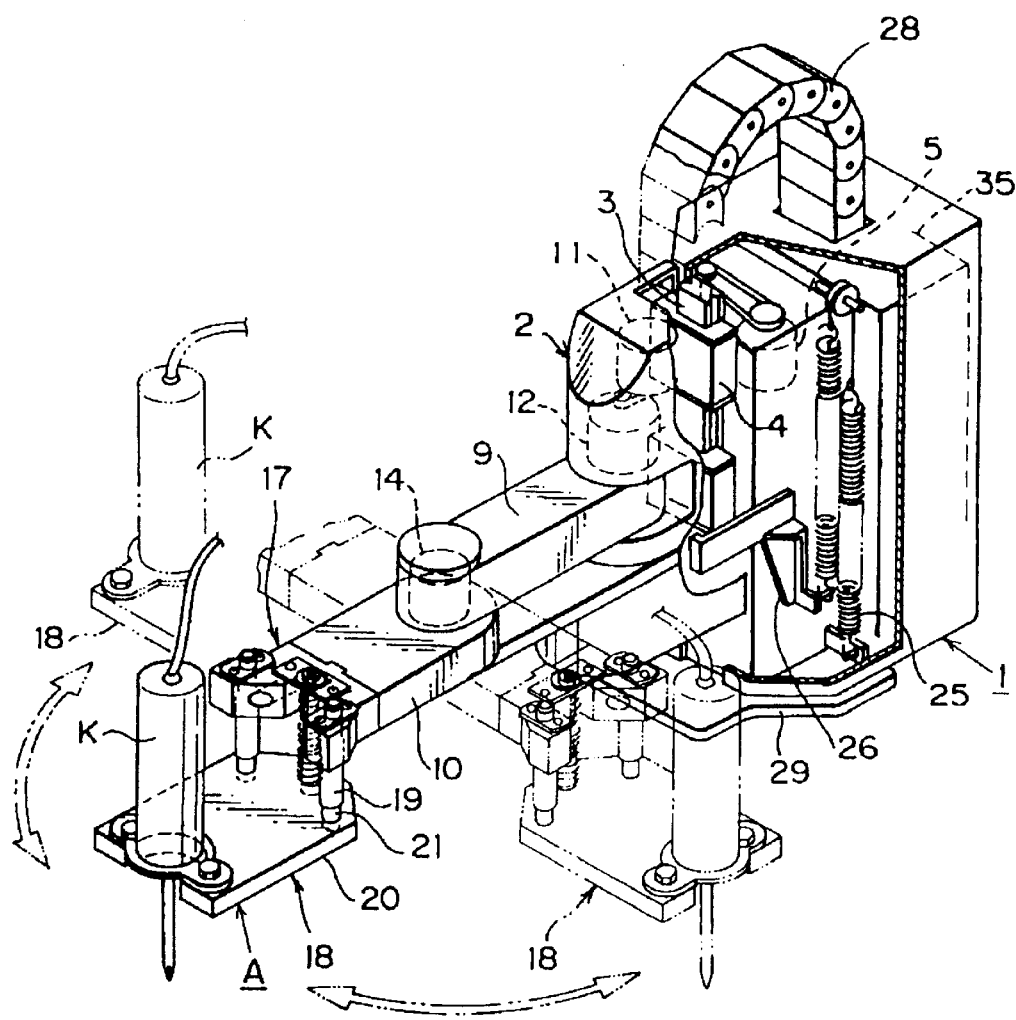
FIG. 1 is a perspective view of the robot of the present invention.
Figure 2:
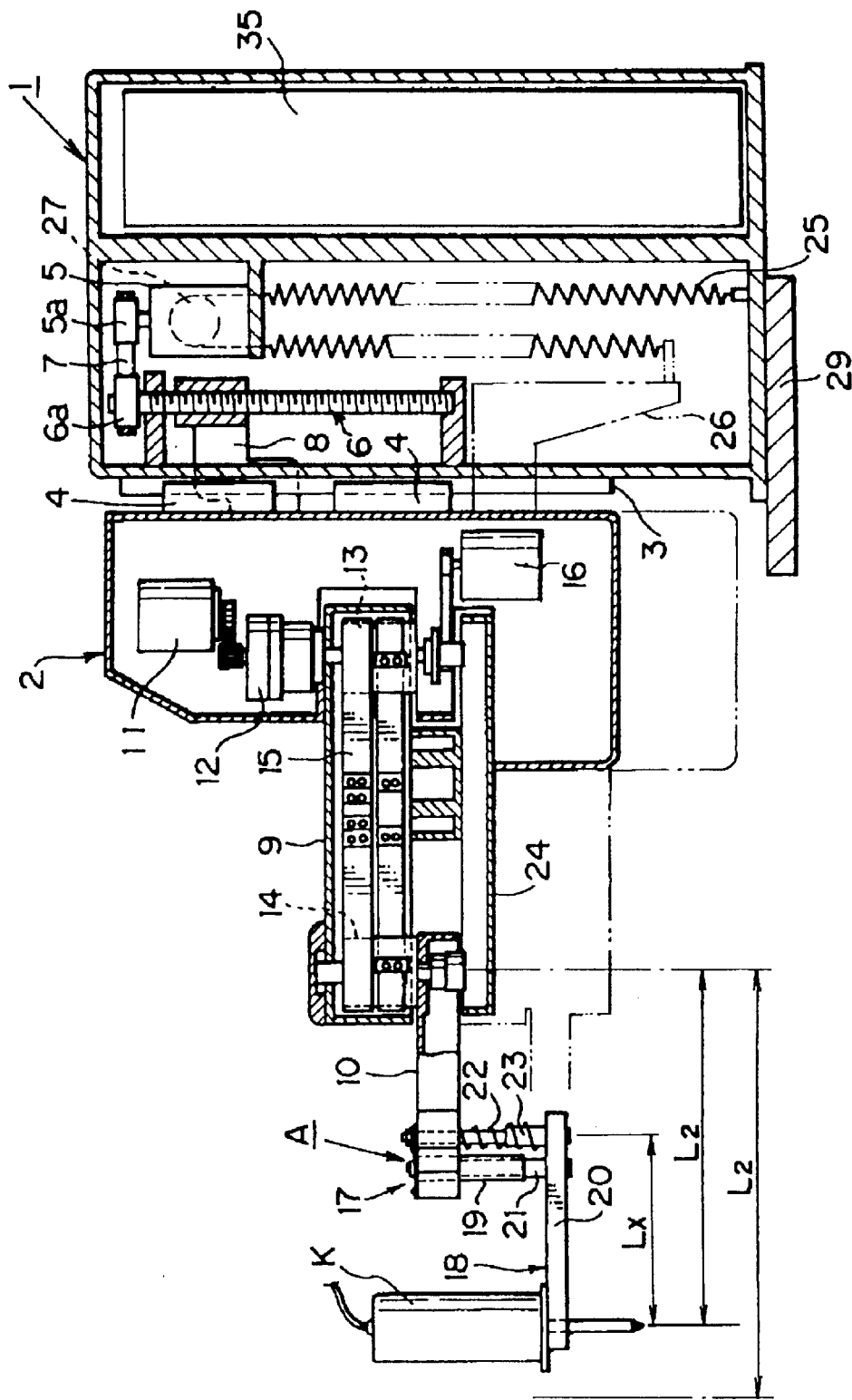
FIG. 2 is a side view, partially in cross-section, of the robot of the present invention.

The invention will now be described in reference to the attached drawings. In FIGS. 1 and 2, the invention of the robot has a substantially hollow robot body 1 and a vertically extending cylindrical hollow mount 2 which is operatively connected to the robot body 1 on the front side thereof such that the mount 2 may be vertical movable the robot body 1. More precisely, the robot body has a vertically extending guide 3 fixedly attached to the front side thereof. The vertical guide 3 is in slide engagement with a slider 4 which is fixed to a rear side of the cylindrical mount 2. Thus the vertical guide 3 and the slider 4 constitute a slide mechanism. Balls may be arranged between the vertical guide 3 and the slider 4 so that the mount 2 may be slidingly moved more smoothly of the robot body 1.

A drive motor 5 is arranged in the robot body 1 which is driven to rotate a vertical threaded shaft 6 which is rotatably journaled at the upper and lower ends thereof in the robot body 1. The rotation of the drive motor 5 is transmitted to the vertical shaft 6 through a transmission belt 7 which is wound around a drive pulley 5a of the drive motor 5 and a follower pulley 6a mounted on the upper end of the threaded shaft 6. A connector 8 is provided between the threaded shaft 6 and the mount 2, the connector having one cylindrical end arranged in threaded engagement with the threaded shaft 6 and the opposite end fixedly connected the rear side of the mount 2. Balls may be arranged between the threaded shaft 6 and the cylindrical end of the connector 8 so that the threaded shaft 6 may be more smoothly rotated.

A first arm 9 of a predetermined length has one end operatively connected to a front side of the cylindrical mount 2 at the intermediate part thereof such that the first arm 9 may be turningly moved in a horizontal plane. A second arm 10 of a predetermined length has one end operatively connected to the opposite end of the first arm 9 such that the second arm 10 may be turningly moved in a horizontal plane. A drive motor 11 is arranged in the cylindrical mount 2 at the upper part thereof The drive motor 11 is connected to a reduction gear 12 by means of a transmission belt. The reduction gear 12 has a drive shaft having a lower end fixedly connected to the one end of the first arm 9 such that the reduction gear is operated to turningly move the first arm 9 in a horizontal plane when the drive motor 11 is driven.

A pair of pulleys 13,14 are mounted on the first arm 9, one 13 of which is positioned at the inner one end of the first arm 9 and the other 14 is positioned at the outer opposite end of the first arm 9. The pulleys 13, 14 are of a same diameter. The pulley 14 has a vertical shaft having a lower end fixedly connected to the inner one end of the second arm 10.

The pulleys 13,14 are connected by means of two transmission belts 15 of stainless steel wound around both pulleys 13 and 14 as arranged in vertical alignment with each other and reversed to each other as shown in FIG. 2. Each of the transmission belts 15 has opposite ends and an intermediate part clamped with plate members respectively so that the transmission belt 15 may be normally tensioned.

A drive motor 16 is provided in the cylindrical mount 2 for rotating the pulley 13, thereby to turningly move the second arm 10 on the first arm 9 in a horizontal plane by way of the transmission belts 15. The second arm 10 has a sectioned free end on which a plurality of working members 18 of laterally different lengths $L_x$ are selectively and removably connected by means of a joint member 17. Thus the second arm 10 has an effective length $L_2$. The value $L_2$ is inputted by means of an output means 31 for subsequent renewal of the existing effective length of the second arm calculation for controlling the movements of the second arm 10 as will be described hereinlater.

Figure 3:
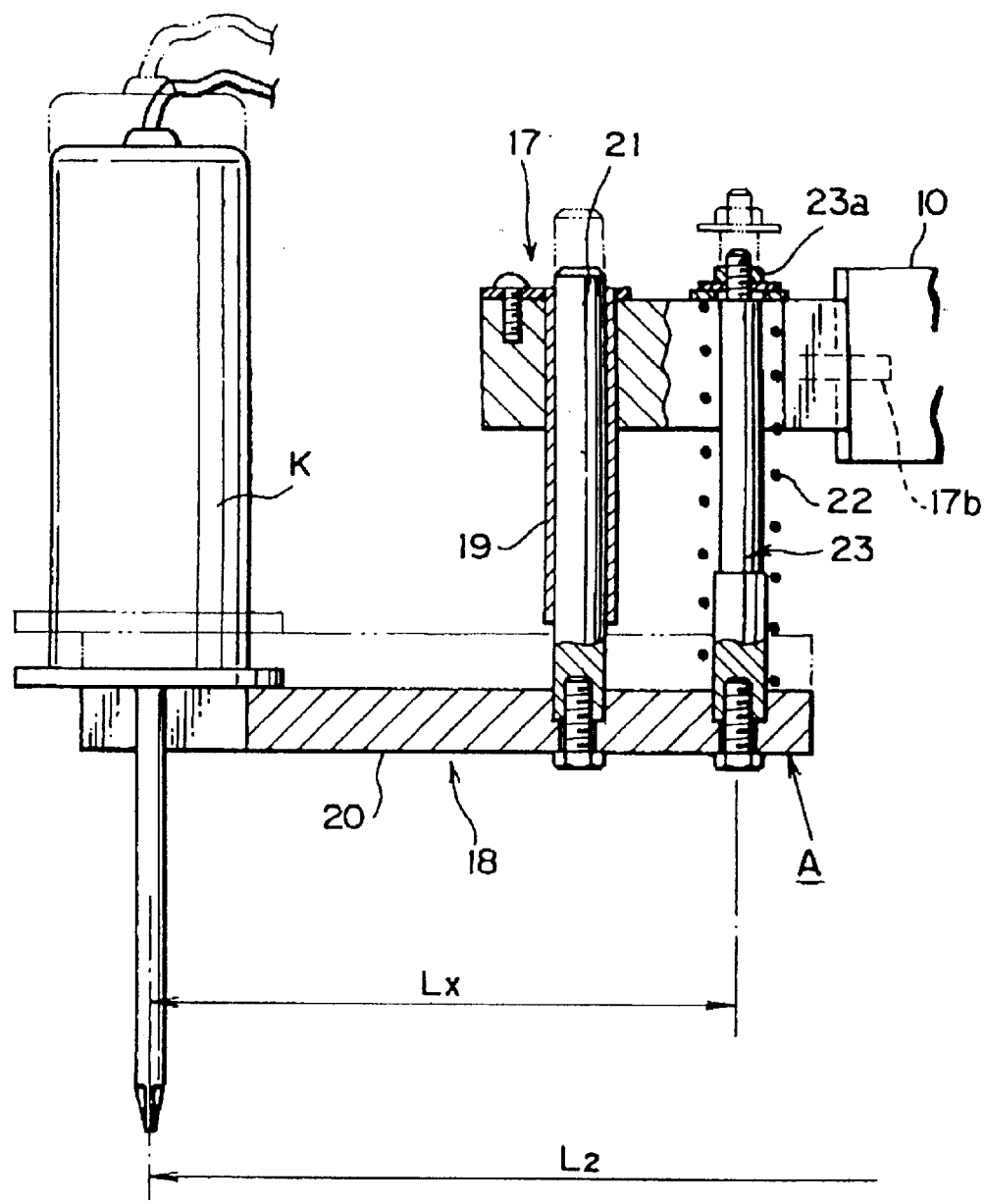
FIG. 3 is a side view, partially in cross-section, of a supplementary unit forming part of the robot of the present invention.
Figure 4:
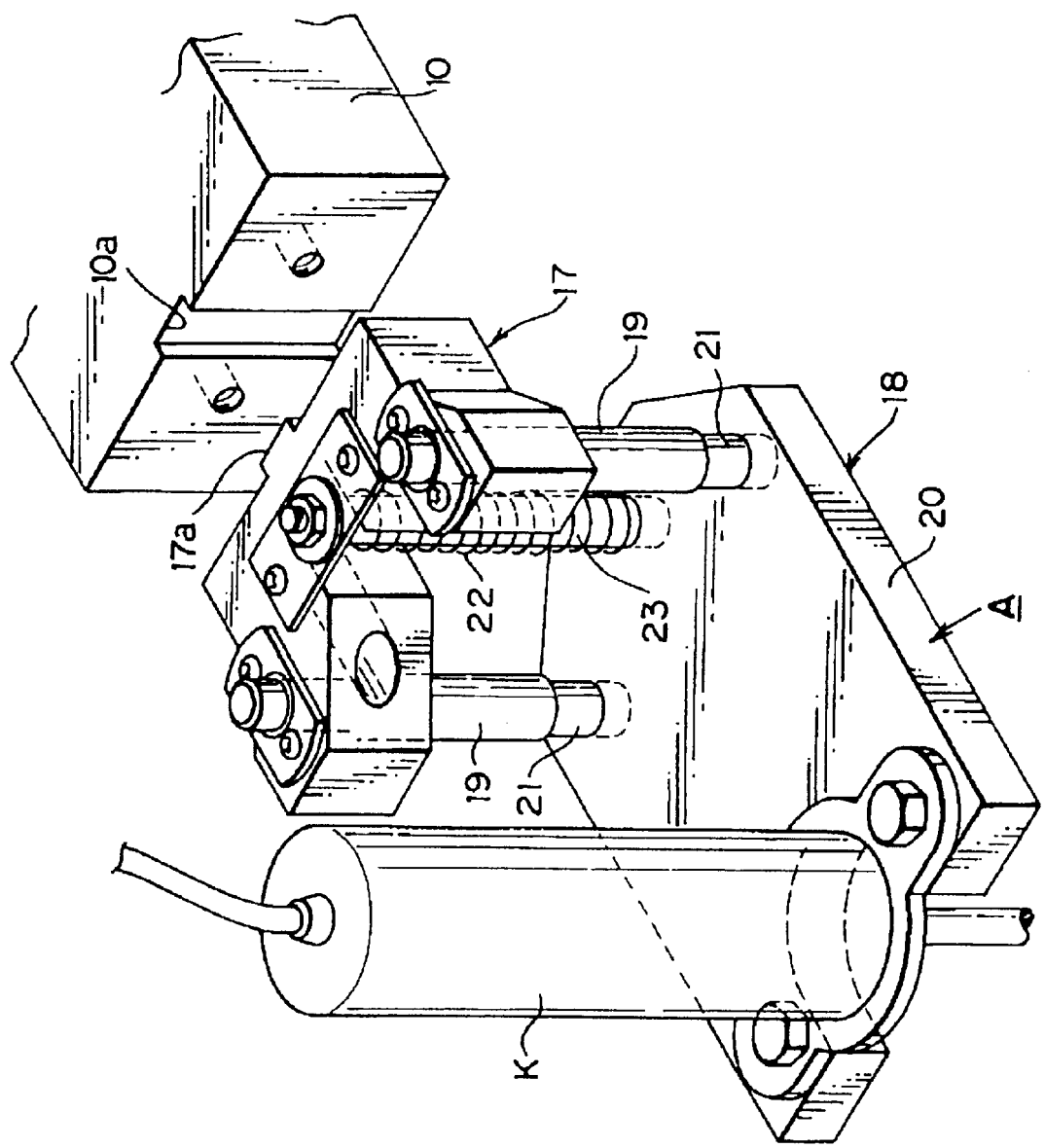
FIG. 4 is a perspective view of a supplementary unit forming part of the robot of the present invention.
Figure 5:
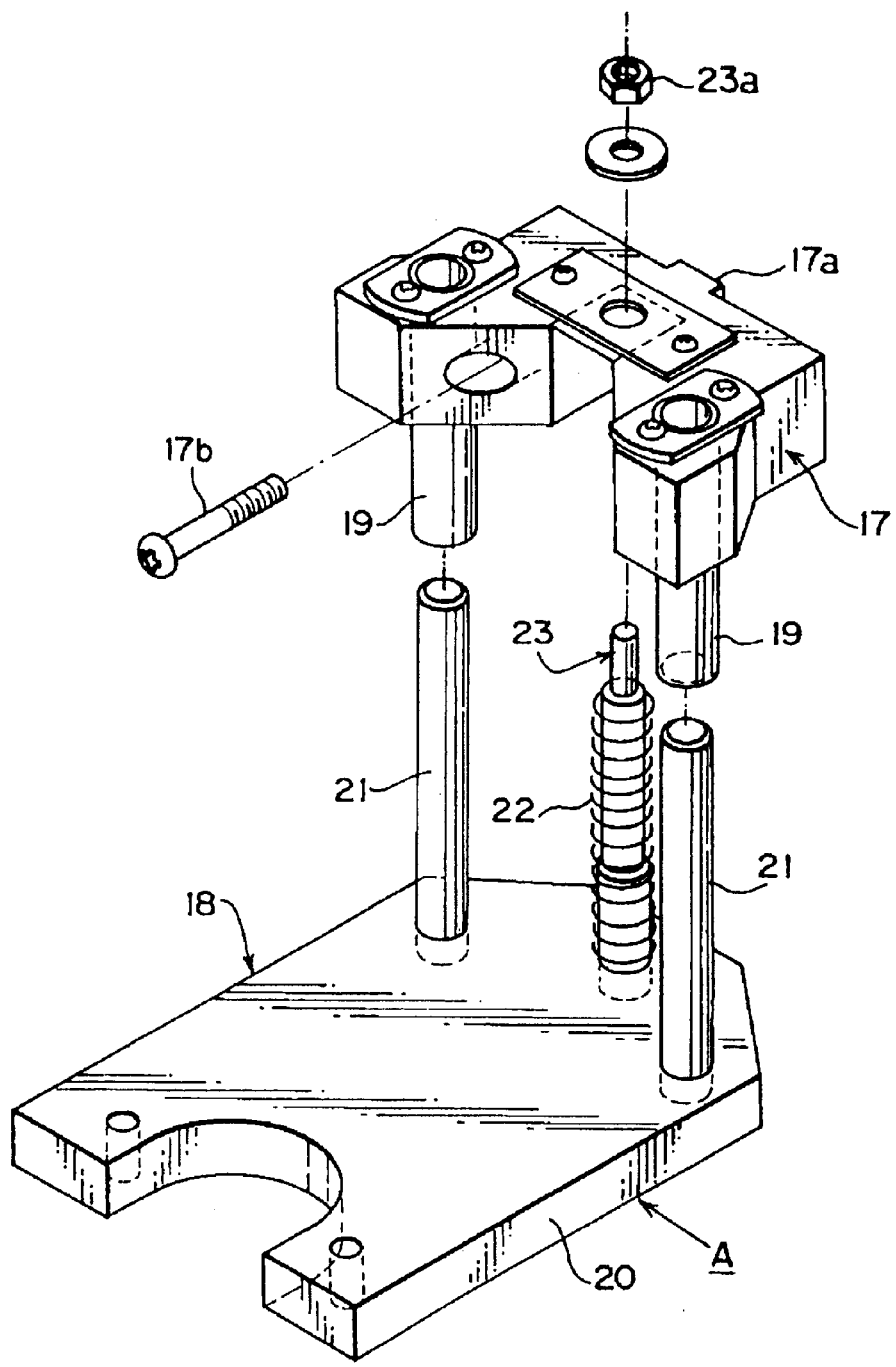
FIG. 5 is an exploded perspective view of a supplementary unit forming part of the robot of the present invention.

As particularly shown in FIGS. 3, 4 and 5, a supplementary unit A is composed of the joint member 17 and the working member 18. The joint member 17 has a pair of cylindrical hollow guides 19, 19 fixed to the opposite ends respectively on the front side thereof and vertically extending. Further the joint member 17 has a vertically extending projection 17a formed on the rear side thereof. The projection 17a is adapted to engage a vertically extending recess 10a formed on the sectioned end of the second arm 10 so that the joint member 17 may be mounted to the second arm 10 with a positionally adjustable manner in vertical direction by means of screws 17b (one of which is shown).

The working member 18 is removably connected to the joint member 17 and is substantially composed of a plate 20 for supporting an electric motor K at the front end thereof, a pair of vertically extending pins 21,21 implanted to the plate 20 on the opposite sides thereof at the rear part thereof and adapted to be inserted into the corresponding hollow guides 19,19 respectively, and a spring actioned connecting pin 23 implanted to the plate 20 between the pins 21, 21 at the further rear part of the plate 20. The plate 20 has a substantial length of Lx which is varied depending on the supplementary unit A. Thus the second arm 10 is complete together with the supplementary unit A and has the effective length $L_2$ which is to be inputted as will be described hereinlater.

When the working member 18 is connected to the joint member 17, the pins 21, 21 of the working member 18 are inserted into the corresponding hollow guides 19, 19 respectively while the spring actioned pin 23 is inserted into a hole of the joint member 17 from below against the spring action of a compression spring 22 arranged around the pin 23, and then the spring actioned pin 23 is screwed with a nut 23a at the upper side of the joint member 17 as particularly in FIG. 5. In this condition, the working member 18 is normally pressed down by the spring action of the compression spring 23a providing a buffer action against an impact which may be given to the working member 18 from below while the latter is working.

The aforementioned drive motors 5, 11 and 16 employed in this embodiment are all stepping motors. Further a motor driver 35 is provided in the robot body 1 as a control device of these stepping motors. As the motor driver 35 may be designed small, the entire size of the robot may be compact and small sized.

In FIGS. 1 and 2, the reference numeral 24 denotes an auxiliary arm which is moved together with the first arm 9. A balancing spring 25 is provided in the robot body 1 having one end anchored to a bottom of the robot body 1 and the opposite end connected to a bracket 26 of the mount 2 through a pulley 27 which is in engagement with the intermediate portion of the balancing spring 26 at the upper art of the robot body 1. The robot has a flexible casing 28 extending between the robot body 1 and the mount for accommodating therein the conductive wires for controlling the stepping motors 5, 11, 16 and the motor driver 35. Numeral 29 denotes a base of the robot body 1. Further the vertical guide 3 may be mounted on the cylindrical mount 2 instead of being mounted on the robot body 1 while the slider 4 may be mounted on the robot body 1 instead of being mounted on the cylindrical mount 2.

Figure 6:
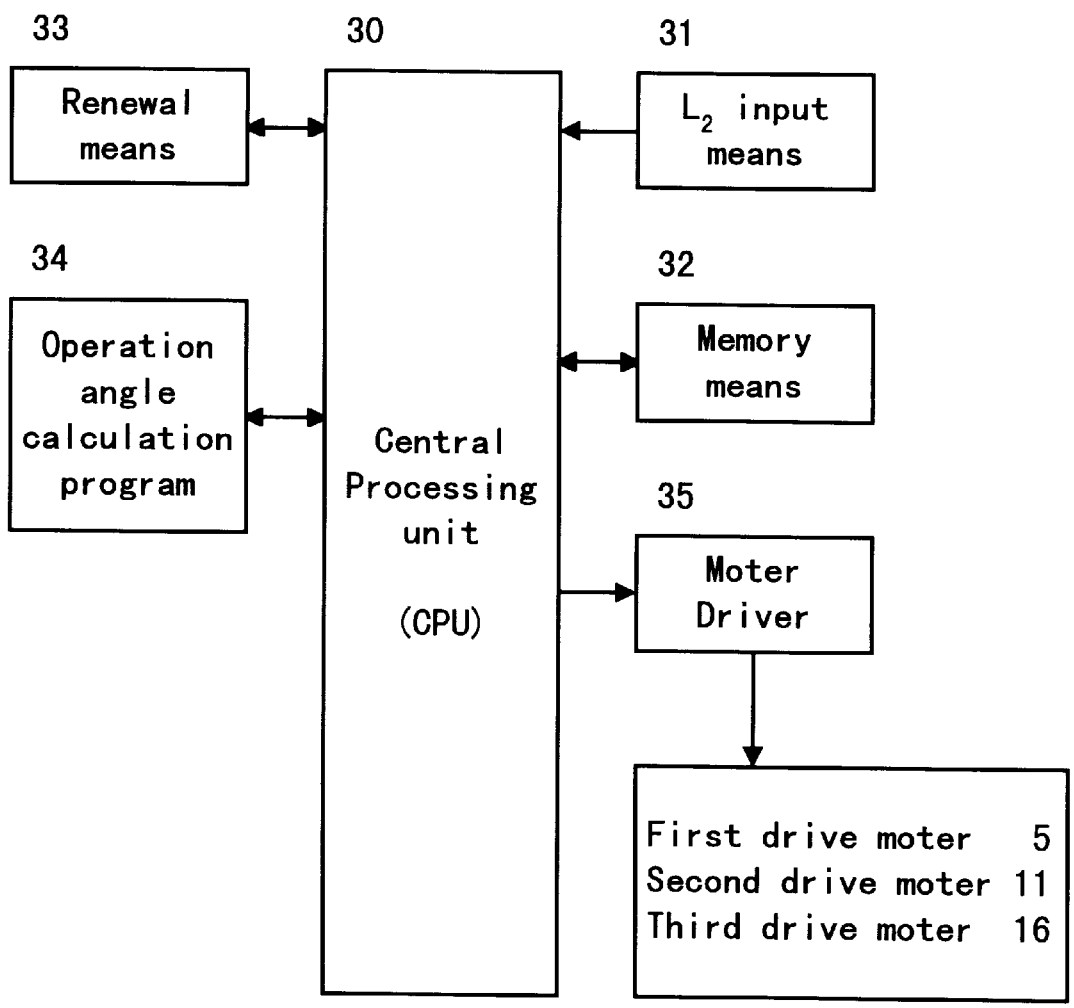
FIG. 6 is a block diagram detailing a control system for controlling the robot of the present invention.

FIG. 6 shows a block diagram for controlling the robot of the invention. The block diagram substantially comprises a central processing unit (CPU) 30, an input means 31 which is operated to enter the effective length $L_2$ of the second arm 10 which has the working member 18 of a desired length $L_x$ mounted thereto, a memory means 32 for storing the entered value $L_2$, a renewal means 33 for renewing the existing effective arm length data $L'_2$ to the data $L'_2=L_2$, depending on the entered new value, and an operation angle calculation program 34 providing a program enabling the CPU 30 to calculate out the values R and θ of the first and second arms 9, 10 respectively, so that a new angle output may be obtained for the working member 18 of a desired length $L_x$.

Figure 7:
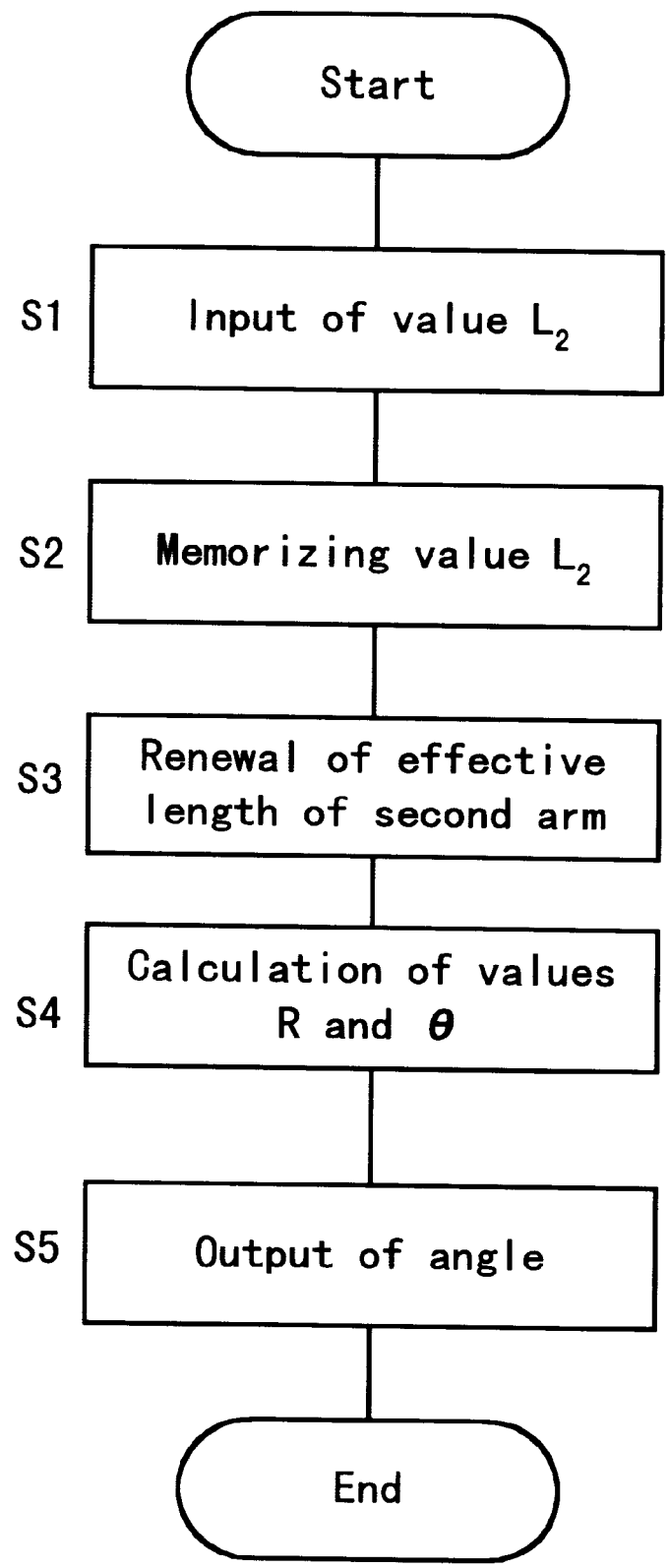
FIG. 7 is a flow chart showing the operation of the block diagram of FIG. 6.

FIG. 7 is a flow chart showing the operations of the block diagram of FIG. 6, wherein an effective length $L_2$ of the second arm 10 is entered at the input means 31 (S1), the entered value $L_2$ is stored in the memory means 32 (S2), the existing effective length of the second arm 10 is renewed depending on the newly entered value $L_2$ (S3), calculation is performed on the basis of the renewed value to determine the values R and θ of the first and second arms 9, 10 respectively (S4), and then the calculated data is delivered to the motor driver 35 (S5) for controlling the operations of the stepping motors 5, 11 and 16.

What is claimed is:

1. A robot with multi-joint arms movable in a horizontal plane substantially comprising:
    a) at least a first arm of a predetermined length and a second arm of a predetermined length having one end operatively connected to said first arm and having a sectioned free end;
    b) a supplementary unit having a predetermined length, said supplementary unit being removably connected to said sectioned free end said second arm and providing an effective length of said second arm;
    c) input means for entering data representing said effective length of said second arm; and
    d) control means for controlling the operations of said first and second arms on the basis of said entered data.

2. The robot as defined in claim 1, wherein said supplementary unit is one of a plurality of supplementary units.

3. The robot as defined in claim 2, wherein said plurality of supplementary units have different lengths respectively.

4. The robot as defined in claim 1, wherein said supplementary unit includes a working member for processing a work.

5. The robot as defined in claim 2, wherein said supplementary unit includes a working member for processing a work, said working member having a different working function depending on a supplementary unit.

6. The robot as defined in claim 1, wherein said supplementary unit is adjustable in vertical direction with respect to said sectioned end of said second arm and normally partly pressed down by spring action.

7. A robot with multi-joint arms movable in a horizontal plane substantially comprising: a robot body; a mount provided on one side of said robot body and movable vertically thereof; a first drive motor for moving said mount; a first arm of a predetermined length, said first arm having one end operatively connected to said mount such that said first arm is adapted to be turningly moved in a horizontal plane; a second drive motor for moving said first arm; a second arm of a predetermined length, said second arm having one end operatively connected to the opposite end of said first arm such that said second arm is adapted to be turningly moved in a horizontal plane; a third drive motor for moving said second arm; a supplementary unit including a joint member connected to the opposite end of said second arm and a working member removably connected to said joint, said working member having a predetermined length providing an effective length of said second arm when said working member is connected to said joint member; input means for entering the data representing said effective length of said second arm; memory means for storing said entered data; renewal means for renewing the existing effective length of said second arm by means of said data stored in said memory means; and control means for calculating out a value on the basis of the value of renewed effective length of said second arm, thereby to control the operations of said first and second arms.

8. The robot as defined in claim 7, wherein said joint member is adjustable in vertical direction with respect to said opposite end of said second arm.

9. The robot as defined in claim 7, wherein said working member is normally pressed down by a spring acting as a buffer.

* * * * *